United States Patent
Stenneth et al.

(10) Patent No.: US 12,469,389 B2
(45) Date of Patent: Nov. 11, 2025

(54) APPARATUS AND METHODS DETERMINING A NEWLY ESTABLISHED VEHICLE-RELATED RULE WITHIN AN AREA

(71) Applicant: HERE GLOBAL B.V., Eindhoven (NL)

(72) Inventors: Leon Stenneth, Chicago, IL (US); Jerome Beaurepaire, Courbevoie (FR); Jeremy Michael Young, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 409 days.

(21) Appl. No.: 18/094,843

(22) Filed: Jan. 9, 2023

(65) Prior Publication Data
US 2024/0233535 A1    Jul. 11, 2024

(51) Int. Cl.
*G08G 1/0967* (2006.01)
*G08G 1/01* (2006.01)

(52) U.S. Cl.
CPC ..... *G08G 1/096791* (2013.01); *G08G 1/0112* (2013.01); *G08G 1/0129* (2013.01); *G08G 1/0141* (2013.01)

(58) Field of Classification Search
CPC ........... G08G 1/096791; G08G 1/0112; G08G 1/0129; G08G 1/0141
See application file for complete search history.

(56) References Cited

U.S. PATENT DOCUMENTS

| | | | |
|---|---|---|---|
| 8,571,743 B1 * | 10/2013 | Cullinane | B60W 30/18154 701/23 |
| 10,268,191 B1 * | 4/2019 | Lockwood | G05D 1/2279 |
| 10,564,638 B1 * | 2/2020 | Lockwood | G05D 1/0027 |
| 11,926,259 B1 * | 3/2024 | Joo | B60Q 9/00 |
| 2014/0063232 A1 * | 3/2014 | Fairfield | G06V 20/58 382/104 |
| 2014/0067187 A1 * | 3/2014 | Ferguson | B60W 60/0011 701/28 |
| 2014/0309833 A1 | 10/2014 | Ferguson et al. | |

(Continued)

FOREIGN PATENT DOCUMENTS

KR    102103834 B1    4/2020

*Primary Examiner* — Curtis J King
(74) *Attorney, Agent, or Firm* — Peter H. Yu; HERE GLOBAL B.V.

(57) ABSTRACT

An apparatus, method and computer program product are provided for determining a newly established vehicle-related rule within an area. In one example, the apparatus receives sensor data indicating attributes of an area for a first period. The attributes indicate a number of vehicle-related tickets issued within the area, a parking orientation of each vehicle within the area, or a combination thereof. The apparatus compares the sensor data to historical data associated with the area. The historical data indicate the attributes of the area for one or more second periods preceding the first period. Based on comparison of the sensor data and the historical data, the apparatus determines a likelihood of a vehicle-related rule established for the area, where the vehicle-related rule did not exist during the one or more second periods. The apparatus causes a notification indicating the likelihood at a user interface.

12 Claims, 8 Drawing Sheets

(56) References Cited

U.S. PATENT DOCUMENTS

| | | | |
|---|---|---|---|
| 2016/0232785 A1* | 8/2016 | Wang | G08G 1/0129 |
| 2017/0017927 A1* | 1/2017 | Domnick | B60W 40/04 |
| 2017/0361835 A1 | 12/2017 | Tarte et al. | |
| 2018/0150764 A1 | 5/2018 | Stenneth | |
| 2018/0174446 A1* | 6/2018 | Wang | G08G 1/096716 |
| 2019/0361432 A1 | 11/2019 | Levinson et al. | |
| 2020/0150653 A1* | 5/2020 | Goldman | H04W 4/024 |
| 2020/0401134 A1* | 12/2020 | Lacaze | G05D 1/0287 |
| 2021/0304608 A1* | 9/2021 | Clark | G08G 1/091 |
| 2021/0370921 A1* | 12/2021 | Silva | B60W 60/0027 |
| 2022/0242442 A1* | 8/2022 | McNeely | B60W 50/14 |
| 2022/0383748 A1* | 12/2022 | Raj | G08G 1/096716 |
| 2023/0117426 A1* | 4/2023 | Kuo | G08G 1/09623 |
| | | | 701/119 |
| 2023/0415761 A1* | 12/2023 | Sura | B60W 50/0205 |
| 2023/0419200 A1* | 12/2023 | Gupta | H04W 4/44 |
| 2024/0042993 A1* | 2/2024 | Yaghoubi | B60W 30/08 |
| 2024/0051429 A1* | 2/2024 | Jo | B60L 53/68 |
| 2024/0059302 A1* | 2/2024 | Yaghoubi | G05B 17/02 |
| 2025/0033653 A1* | 1/2025 | Stumpf | B60W 50/029 |
| 2025/0050912 A1* | 2/2025 | Baker | B60W 50/0097 |

\* cited by examiner

APPARATUS AND METHODS DETERMINING A NEWLY ESTABLISHED VEHICLE-RELATED RULE WITHIN AN AREA

TECHNICAL FIELD

The present disclosure generally relates to the field of mapping, associated methods and apparatus, and in particular, concerns, for example, an apparatus configured to determining a newly established vehicle-related rule within an area based on comparison of sensor data acquired within the area and historical data associated with the area.

BACKGROUND

Local map changes may adversely impact uninformed users of vehicles. By way of example, a parking restriction rule may be newly established for a local street that has previously provided unrestricted parking spaces for vehicles. Users of vehicles that are unaware of such rule may unknowingly park within the local street and receive parking tickets or fines for breaking the rule. Additionally, certain local map changes may not be readily detectable by users of vehicles in that road signs indicating the changes are hidden or displayed in locations that are atypical for regular road signs. Therefore, there is a need in the art that readily detects local map changes and informs user of vehicles regarding said changes.

The listing or discussion of a prior-published document or any background in this specification should not necessarily be taken as an acknowledgement that the document or background is part of the state of the art or is common general knowledge.

BRIEF SUMMARY

According to a first aspect, an apparatus comprising at least one processor and at least one non-transitory memory including computer program code instructions is described. The computer program code instructions, when executed, cause the apparatus to: receive sensor data indicating attributes of an area for a first period, the attributes indicating a number of vehicle-related tickets issued within the area, a parking orientation of each vehicle within the area, or a combination thereof; compare the sensor data to historical data associated with the area, the historical data indicating the attributes of the area for one or more second periods preceding the first period, based on comparison of the sensor data and the historical data, determine a likelihood of a vehicle-related rule established for the area, wherein the vehicle-related rule did not exist during the one or more second periods; and cause a notification indicating the likelihood at a user interface.

In various embodiments, to determine the likelihood, the computer program code instructions are further configured to, when executed, cause the apparatus to, responsive to the number of vehicle-related tickets issued within the area for the first period exceeding the number of vehicle-related tickets issued within the area for each of the one or more second periods, increase the likelihood.

In various embodiments, to determine the likelihood, the computer program code instructions are further configured to, when executed, cause the apparatus to: determine an average number of vehicle-related tickets issued within the area based on the historical data; compare the average number of vehicle-related tickets to the number of vehicle-related tickets issued within the area for the first period; responsive to the number of vehicle-related tickets issued within the area for the first period exceeding the average number of vehicle-related tickets, increase the likelihood.

In various embodiments, to determine the likelihood, the computer program code instructions are further configured to, when executed, cause the apparatus to: determine one or more patterns of vehicle parking orientations within the area based on the historical data; compare parking orientations of all vehicles within the area for the first period to the one or more patterns of vehicle parking orientations; responsive to the parking orientations of all vehicles within the area for the first period deviating from the one or more patterns of vehicle parking orientations, increase the likelihood.

In various embodiments, the computer program code instructions are further configured to, when executed, cause the apparatus to: based on the sensor data and the historical data, determine a type of vehicle-related rule established for the area; and cause an additional notification indicating the type of vehicle-related rule at the user interface.

In various embodiments, the computer program code instructions are further configured to, when executed, cause the apparatus to: based on the sensor data, determine a spatial extent of which the vehicle-related rule is applied within the area; and cause an additional notification indicating the spatial extent at the user interface.

In various embodiments, the attributes further indicate, for each road portion within the area: (i) a road type; (ii) a functional class; (iii) a number of lanes; (iv) a presence of one or more bike lanes; (v) road dimensions; (vii) one or more points-of-interests (POIs) associated with said road portion; (viii) one or more road markings; (ix) one or more road signs associated with said road portion; or (x) a combination thereof.

According to a second aspect, a non-transitory computer-readable storage medium having computer program code instructions stored therein is described. the computer program code instructions, when executed by at least one processor, cause the at least one processor to: receive sensor data indicating attributes of an area for a first period, the attributes indicating a number of vehicle-related tickets issued within the area, a parking orientation of each vehicle within the area, or a combination thereof; compare the sensor data to historical data associated with the area, the historical data indicating the attributes of the area for one or more second periods preceding the first period, based on comparison of the sensor data and the historical data, determine a likelihood of a vehicle-related rule established for the area, wherein the vehicle-related rule did not exist during the one or more second periods; and cause a notification indicating the likelihood at a user interface.

According to a third aspect, a method of determining a newly established vehicle-related rule within an area, the method comprising: receiving sensor data indicating attributes of the area for a first period, the attributes indicating a number of vehicle-related tickets issued within the area, a parking orientation of each vehicle within the area, or a combination thereof; comparing the sensor data to historical data associated with the area, the historical data indicating the attributes of the area for one or more second periods preceding the first period; based on comparison of the sensor data and the historical data, determining a likelihood of a vehicle-related rule established for the area, wherein the vehicle-related rule did not exist during the one or more second periods; and causing a notification indicating the likelihood at a user interface.

Also, a computer program product may be provided. For example, a computer program product comprising instructions which, when the program is executed by a computer, cause the computer to carry out the steps described herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

The embodiments of the invention are illustrated by way of example, and not by way of limitation, in the figures of the accompanying drawings.

DETAILED DESCRIPTION

As discussed above, users of vehicles may be unaware of new local map changes and receive tickets, fines, or other penalties for failing to adhere to vehicle-related rules established via said changes. Local map changes may be harder for users of vehicles to detect if road signs indicating the changes are hidden or displayed in locations that are atypical for regular road signs. For example, when building constructions occur proximate to local streets, parking restriction signs may be installed at the peripherals of the local streets. Since constructions are temporary, the signs are designed to be quickly installed and removed. In some instances, such signs may be posters attached to stationary objects within the peripherals of the local streets, such as posts, trees, walls, etc. Since the location of said signs and a way of which said signs is displayed differ from regular road signs, users of vehicles may easily overlook said signs and vehicles equipped with cameras may not recognize said signs as parking restriction signs.

Embodiments described herein provide a system that determines a newly established vehicle-related rule within an area based on comparison of sensor data acquired within the area and historical data associated with the area. The system includes an assessment platform that receives sensor data indicating attributes of the area for a first period, where the attributes indicate a number of vehicle-related tickets issued within the area, a parking orientation of each vehicle within the area, or a combination thereof. The sensor data may be acquired from one or more vehicles including sensors, such as image capturing sensors, and are traversed the area during the first period. The assessment platform compares the sensor data to historical data associated with the area, where the historical data indicate the attributes of the area for one or more second periods preceding the first period. The historical data may be generated based on sensor data that are acquired by one or more vehicles that traversed the area during the one or more second periods. Based on comparison of the sensor data and the historical data, the assessment platform determines a likelihood of a vehicle-related rule established for the area. The assessment platform causes a notification indicating the likelihood at a user interface. The user interface may be a device of a user that is intending to park his/her vehicle within the area. Details of such embodiments will be described further herein.

Figure 1:
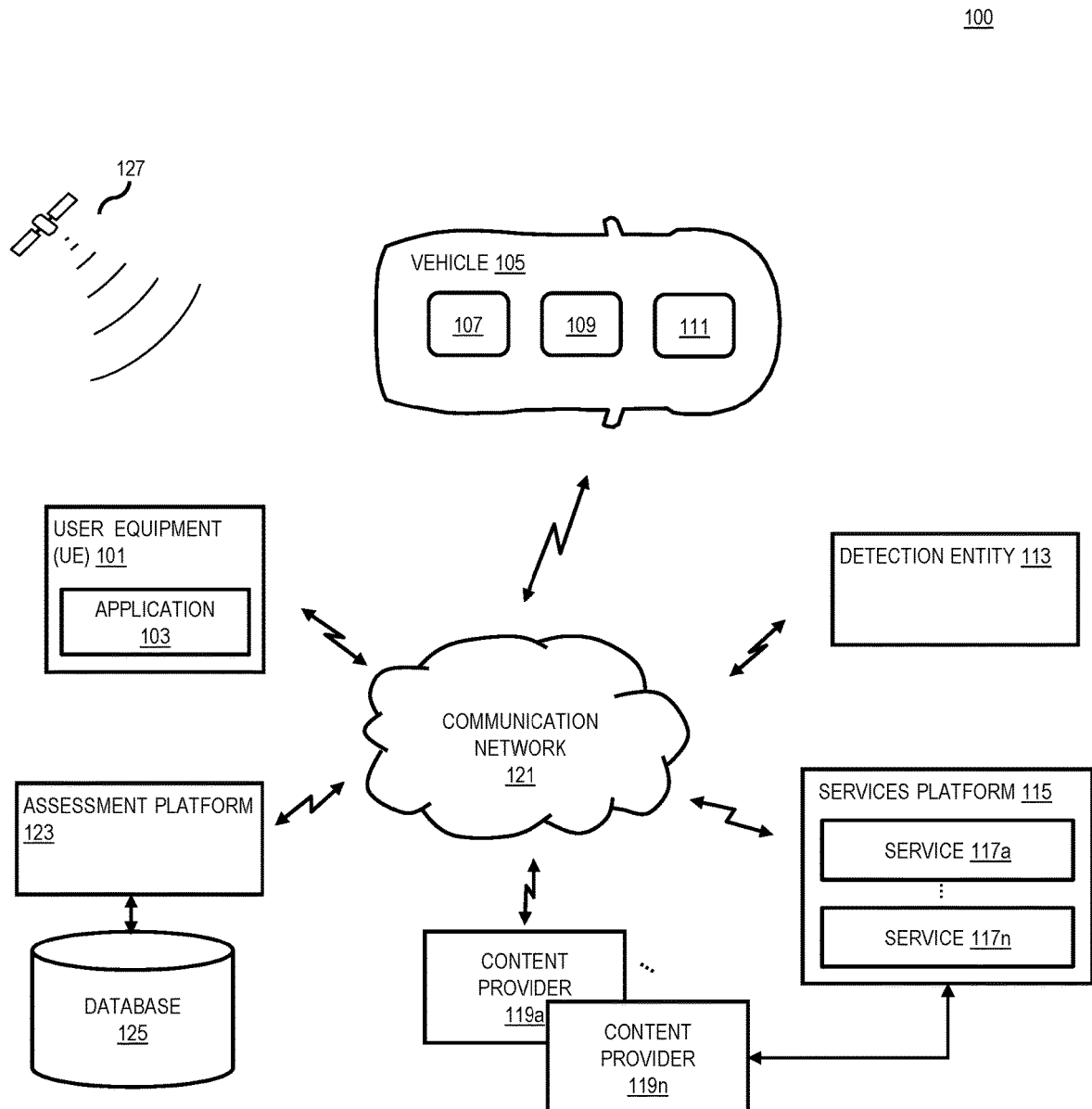
FIG. 1 illustrates a diagram of a system capable of determining a newly established vehicle-related rule within an area.

FIG. 1 is a diagram of a system 100 capable of determining a newly established vehicle-related rule within an area, according to one embodiment. Herein, a vehicle-related rule may be a rule related to parking restrictions, turn restrictions, a road directionality (e.g., one way or two way road), traffic (e.g., a stop sign), bike lane, bus lane rule, or other vehicle-related rules. The term "newly established vehicle-related rule" may refer a vehicle-related rule that was recently established for a given area (e.g., hours to a week) and is currently in effect within the area. The system includes a user equipment (UE) 101, a vehicle 105, a detection entity 113, a services platform 115, content providers 119a-119n, a communication network 121, an assessment platform 123, a database 125, and a satellite 127. Additional or a plurality of mentioned components may be provided.

In the illustrated embodiment, the system 100 comprises a user equipment (UE) 101 that may include or be associated with an application 103. In one embodiment, the UE 101 has connectivity to the assessment platform 123 via the communication network 121. The assessment platform 123 performs one or more functions associated with determining a newly established vehicle-related rule within an area. In the illustrated embodiment, the UE 101 may be any type of mobile terminal or fixed terminal such as a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with a vehicle (e.g., as part of an infotainment system of the vehicle), or any combination thereof, including the accessories and peripherals of these devices. In one embodiment, the UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the UE 101 can be a cellular telephone. A user may use the UE 101 for navigation functions, for example, road link map updates. It should be appreciated that the UE 101 can support any type of interface to the user (such as "wearable" devices, etc.).

In the illustrated embodiment, the application 103 may be any type of application that is executable by the UE 101, such as a mapping application, a location-based service application, a navigation application, a content provisioning service, a camera/imaging application, a media player application, a social networking application, a calendar application, or any combination thereof. In one embodiment, one of the applications 103 at the UE 101 may act as a client for the assessment platform 123 and perform one or more functions associated with the functions of the assessment platform 123 by interacting with the assessment platform 123 over the communication network 121. In one embodiment, the application 103 may provide indication of a newly established vehicle-related rule within an area. The application 103 may indicate a likelihood of such rule being established within the area, a type of vehicle-related rule established within the area, and a spatial extent of which the vehicle-related rule is applied within the area. If the vehicle-related rule is a parking restriction rule, the application 103 may also provide alternative parking spaces proximate to the area.

The vehicle 105 may be a standard gasoline powered vehicle, a hybrid vehicle, an electric vehicle, a fuel cell vehicle, and/or any other mobility implement type of vehicle. The vehicle 105 includes parts related to mobility, such as a powertrain with an engine, a transmission, a suspension, a driveshaft, and/or wheels, etc. The vehicle 105 may be a non-autonomous vehicle or an autonomous vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one embodiment, the vehicle 105 may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle 105, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

In one embodiment, the UE 101 may be integrated in the vehicle 105, which may include assisted driving vehicles such as autonomous vehicles, highly assisted driving (HAD), and advanced driving assistance systems (ADAS). Any of these assisted driving systems may be incorporated into the UE 101. Alternatively, an assisted driving device may be included in the vehicle 105. The assisted driving device may include memory, a processor, and systems to communicate with the UE 101. In one embodiment, the vehicle 105 may be an HAD vehicle or an ADAS vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The vehicle 105 may also include a completely driverless mode. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

In one embodiment, the vehicle 105 includes sensors 107, an on-board communication platform 109, and an on-board computing platform 111. The sensors 107 may include image sensors (e.g., electronic imaging devices of both analog and digital types, which include digital cameras, camera modules, camera phones, thermal imaging devices, radar, sonar, lidar, etc.), a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, traction sensor, suspension sensor, tilt sensors to detect the degree of incline or decline of the vehicle 105 along a path of travel, etc. In a further embodiment, one or more of the sensors 107 about the perimeter of the vehicle 105 may detect the relative distance of the vehicle 105 from stationary objects (e.g., construct, wall, etc.), road objects, lanes, or roadways, the presence of other vehicles, pedestrians, traffic lights, road features (e.g., curves) and any other objects, or a combination thereof. Said sensors 107 may also detect orientations of such objects. In one embodiment, the vehicle 105 may include GPS receivers to obtain geographic coordinates from satellites 127 for determining current location and time associated with the vehicle 105. Further, the location can be determined by a triangulation system such as A-GPS, Cell of Origin, or other location extrapolation technologies.

The on-board communications platform 109 includes wired or wireless network interfaces to enable communication with external networks. The on-board communications platform 109 also includes hardware (e.g., processors, memory, storage, antenna, etc.) and software to control the wired or wireless network interfaces. In the illustrated example, the on-board communications platform 109 includes one or more communication controllers (not illustrated) for standards-based networks (e.g., Global System for Mobile Communications (GSM), Universal Mobile Telecommunications System (UMTS), Long Term Evolution (LTE) networks, 5G networks, Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the on-board communications platform 109 includes a wired or wireless interface (e.g., an auxiliary port, a Universal Serial Bus (USB) port, a Bluetooth® wireless node, etc.) to communicatively couple with the UE 101.

The on-board computing platform 111 performs one or more functions associated with the vehicle 105. In one embodiment, the on-board computing platform 109 may aggregate sensor data generated by at least one of the sensors 107 and transmit the sensor data via the on-board communications platform 109. The on-board computing platform 109 may receive control signals for performing one or more of the functions from the assessment platform 123, the UE 101, the services platform 115, one or more of the content providers 119a-119n, or a combination thereof via the on-board communication platform 111. The on-board computing platform 111 includes at least one processor or controller and memory (not illustrated). The processor or controller may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The detection entity 113 may be another vehicle, a drone, a user equipment, or a roadside sensor. The detection entity 113 includes one or more image sensors such as electronic imaging devices of both analog and digital types, which include digital cameras, camera modules, camera phones, thermal imaging devices, radar, sonar, lidar, etc. The detection entity 113 may further include a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, tilt sensors to detect the degree of incline or decline of the detection entity 113 along a path of travel, etc. In a further embodiment, sensors about the perimeter of the detection entity 113 may detect the relative distance of the detection entity 113 from road objects, lanes, or roadways, the presence of other vehicles, pedestrians, traffic lights, road features (e.g., curves) and any other objects, or a combination thereof. Said sensors may also detect orientations of such objects. In one embodiment, the detection entity 113 may include GPS receivers to obtain geographic coordinates from satellites 127 for determining current location and time associated with the detection entity 113. Further, the location can be determined by a triangulation system such as A-GPS, Cell of Origin, or other location extrapolation technologies. The detection entity 113 may further include a receiver and a transmitter for maintaining communication with the assessment platform 123 and/or other components within the system 100.

The services platform 115 may provide one or more services 117a-117n (collectively referred to as services 117), such as mapping services, navigation services, travel planning services, weather-based services, emergency-based services, notification services, social networking services, content (e.g., audio, video, images, etc.) provisioning services, application services, storage services, contextual information determination services, location-based services, information-based services, etc. In one embodiment, the services platform 115 may be an original equipment manufacturer (OEM) platform. In one embodiment the one or more service 117 may be sensor data collection services. By way of example, vehicle sensor data provided by the sensors 107 may be transferred to the UE 101, the assessment platform 123, the database 125, or other entities communicatively coupled to the communication network 121 through the service platform 115. In one embodiment, the services platform 115 uses the output data generated by of the assessment platform 123 to provide services such as navigation, mapping, other location-based services, etc.

In one embodiment, the content providers 119a-119n (collectively referred to as content providers 119) may provide content or data (e.g., including geographic data, parametric representations of mapped features, etc.) to the UE 101, the vehicle 105, services platform 115, the vehicle 105, the database 125, the assessment platform 123, or the combination thereof. In one embodiment, the content provided may be any type of content, such as map content, textual content, audio content, video content, image content, etc. In one embodiment, the content providers 119 may provide content that may aid in determining a newly established vehicle-related rule within an area, and/or other related characteristics. In one embodiment, the content providers 119 may also store content associated with the UE 101, the vehicle 105, services platform 115, the assessment platform 123, the database 125, or the combination thereof. In another embodiment, the content providers 119 may manage access to a central repository of data, and offer a consistent, standard interface to data, such as a repository of the database 125.

The communication network 121 of system 100 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In the illustrated embodiment, the assessment platform 123 may be a platform with multiple interconnected components. The assessment platform 123 may include multiple servers, intelligent networking devices, computing devices, components and corresponding software for determining a newly established vehicle-related rule within an area. It should be appreciated that that the assessment platform 123 may be a separate entity of the system 100, included within the UE 101 (e.g., as part of the applications 103), included within the vehicle 105 (e.g., as part of an application stored in the memory of the on-board computing platform 111), included within the services platform 115 (e.g., as part of an application stored in server memory for the services platform 115), included within the content providers 119 (e.g., as part of an application stored in sever memory for the content providers 119), or a combination thereof.

The assessment platform 123 is capable of: (1) receiving sensor data indicating attributes of an area for a first period, the attributes indicating a number of vehicle-related tickets issued within the area, a parking orientation of each vehicle within the area, or a combination thereof; (2) comparing the sensor data to historical data associated with the area, the historical data indicating the attributes of the area for one or more second periods preceding the first period; and (3) based on comparison of the sensor data and the historical data, determine a likelihood of a vehicle-related rule established for the area. It is contemplated that the assessment platform 123 need not render the likelihood of the vehicle-related rule established for the area if the assessment platform 123 receives data indicating detection of said vehicle-related rule within the area (e.g., image sensor of a vehicle detects a newly installed sign within the area indicating the vehicle-related rule). However, for scenarios in which such data is unavailable or non-existent, the assessment platform 123 may determine the likelihood and inform users intending to traverse to the area or park within the area. Processes for determining the likelihood will be further described herein.

At the outset, the assessment platform 123 may receive sensor data indicating attributes associated with an area over various periods of time. The sensor data may be acquired by one or more detection entities 113 that was within the area during the periods. By way of example, a vehicle equipped with sensors, a sensor mounted on a post or a building, or other sensing entities that were within the area during the periods may acquire the sensor data and provide the same to the assessment platform 123. In one embodiment, the sensor data may be image data including one or more images indicating one or more attributes of the area. In one embodiment, the attributes indicate a number of vehicle-related tickets issued within the area, a parking orientation of each vehicle within the area, or a combination thereof. The parking orientation may indicate, for each vehicle within the area, a direction at which said vehicle is facing and a location of said vehicle. In one embodiment, the assessment platform 123 may deem image data as data indicating issuance of a vehicle-related ticket within the area if the image data was acquired within the area and include one or more images depicting a ticket attached to a vehicle. By way of example, the assessment platform 123 may determine that a vehicle-related ticket was issued within the area if a ticket is attached to a windshield of the vehicle or another outer surface of the vehicle or if a ticket is placed between a windshield wiper and the windshield. In one embodiment, the assessment platform 123 may be trained to recognize an object within an image as a vehicle-related ticket by using training data including a plurality of images of vehicle-related tickets. In one embodiment, the assessment platform 123 may be trained to recognize an object within an image as a vehicle-related ticket by: (1) identifying a region in which the image was acquired; (2) identifying one or more vehicle-related tickets that are issued within the region; and (3) determining whether the image includes an object that corresponds to the one or more vehicle-related tickets. Sensor data indicating attributes of an area may be stored in the database 125 and be used for future use when the assessment platform receives a request for rendering a likelihood of a vehicle-related rule established for an area.

The assessment platform 123 may receive a request for rendering a likelihood of a vehicle-related rule established for an area in response to a user of a vehicle selecting a destination within the area. By way of example, the UE 101 and/or a user interface within the vehicle 105 may receive a user input indicating selection of the destination (e.g., a user requests a route to the destination). When the assessment platform 123 receives the request, the assessment platform 123 determines whether a vehicle-related rule was recently established for the area. To render such determination, the assessment platform 123 determines whether the database 125 includes sensor data indicating attributes of the area for a first period and historical data indicating the attributes of the area for one or more second periods preceding the first period. In one embodiment, the first period may indicate the latest period in which the attributes of the area was acquired by one or more sensors (e.g., detection entities 113). In one embodiment, the first period may be a period selected from a plurality of past periods in which the attributes of the area was acquired by one or more sensors. In one embodiment, the first period may be a period in which the attributes of the area are substantially different than the attributes of the area during one or more periods preceding the period. The second period is any period that precedes the first period and indicate one or more past periods in which the attributes of the area was acquired by one or more sensors (e.g., detection entities 113). If the database 125 includes the sensor data and the historical data for the area, the assessment platform 123 compares the attributes of the area for the first period and the attributes of the area for the one or more second periods to determine a likelihood of a vehicle-related rule established for the area.

In one embodiment, the assessment platform 123 may determine a likelihood of a vehicle-related rule established for an area based on a number of vehicle-related ticket issued within the area. In such embodiment, if the number of vehicle-related ticket issued within the area during the first period exceeds the number of vehicle-related tickets issued within the area during each of the one or more second periods, the assessment platform 123 may increase the likelihood in which a vehicle-related rule was established within the area. For example, if the historical data indicate that a number of vehicle-related ticket issued within a road segment for Monday, Tuesday, and Wednesday is 1, 2, and 1, respectively, and the sensor data indicate that a number of vehicle-related ticket issued within the road segment for Thursday is 5, the assessment platform 123 may increase a likelihood in which a vehicle-related rule is established within the area.

In one embodiment, the assessment platform 123 may determine an average number of vehicle-related tickets issued within the area based on the historical data and determine the likelihood in which a vehicle-related rule is established within the area based on comparison of a number of-vehicle-related tickets issued within the area for the first period and the average number of vehicle-related tickets issued within the area. For example, if a number of vehicle-related ticket issued within a road segment for Monday, Tuesday, and Wednesday is 1, 2, and 1, respectively, the assessment platform 123 determines that the average number of vehicle-related tickets issued within the road segment is 1.33. If the sensor data indicate that a number of vehicle-related ticket issued within the road segment for Thursday is 5, the assessment platform 123 determines that the number of vehicle-related ticket issued within the road segment for Thursday is greater than the average number of vehicle-related tickets issued within the road segment and increases the likelihood in which a vehicle-related rule is established within the area.

It is contemplated that an average number of vehicle-related tickets issued to vehicles within the area may increase as a number of vehicles parked within the area increases. As such, in one embodiment, the assessment platform 123 may: (1) determine a first ratio of a number of vehicle-related tickets issued within the area for the first period and a total number of vehicles parked within the area for the first period; (2) determine a second ratio of a number of vehicle-related tickets issued within the area for each of the one or more second periods and a total number of vehicles parked within the area for each of the one or more second periods; (3) compare the first and second ratios; and (4) determine the likelihood in which a vehicle-related rule is established within the area based on the comparison. For example, a number of vehicle-related tickets issued within a road segment for Monday, Tuesday, and Wednesday is 1, 2, and 1, respectively, and the total number of vehicles parked within the road segment for Monday, Tuesday, and Wednesday is 4, 5, and 5. Further, a number of vehicle-related tickets issued within the road segment for Thursday is 4 and the total number of vehicles parked within the road segment for Thursday is 6. Since the ratio for Thursday is 0.66 and is greater than the ratios for Monday, Tuesday, and Wednesday (i.e., 0.25, 0.4, and 0.2), the assessment platform 123 increases the likelihood in which a vehicle-related rule is established within the area. It is also contemplated that the comparison may be made between the first ratio and the average of the second ratios.

In one embodiment, the assessment platform 123 may determine the likelihood of whether a vehicle-related rule is established for an area based on parking orientations of vehicles within an area. In such embodiment, the assessment platform 123: (1) determines one or more patterns of vehicle parking orientations within the area based on the historical data; (2) compares parking orientations of all vehicles within the area for the first period to the one or more patterns of vehicle parking orientations; (3) if the parking orientations of all vehicles within the area for the first period deviates from the one or more patterns of vehicle parking orientations, increases the likelihood. For example, the assessment platform 123 may receive historical data indicating that vehicles park evenly at both sides of a road segment for Monday, Tuesday, and Wednesday. The assessment platform 123 may further receive sensor data indicating that a greater number of vehicles are parked on one side of the road segment and a fewer number of vehicles are parked on the other side of the road segment for Thursday. Since the parking orientations of vehicles within the road segment for Thursday is substantially different from the parking orientations of vehicles within the road segment for Monday, Tuesday, and Wednesday, the assessment platform 123 increases the likelihood of a vehicle-related rule established for the road segment. In one embodiment, the assessment platform 123 may determine the likelihood based on a combination of a number of vehicle-related tickets issued within an area and parking orientations of vehicles within the area. In such embodiment, the weight of the likelihood may be greater if both of the attributes of the area affirm existence of a vehicle-related rule within the area.

In one embodiment, the assessment platform 123 may determine a type of vehicle-related rule established for the area. For example, the assessment platform 213 may receive sensor data indicating that a plurality of vehicles is parked on one side of a first road segment and a single vehicle is parked on the other side of the first road segment and has a vehicle-related ticket issued thereto. The assessment platform 123 may compare the sensor data to historical data that correlate vehicle parking orientations and vehicle-related tickets issued to vehicles to various vehicle-related rules. Based on the comparison, the assessment platform 123 may identify that the attributes of the sensor data are similar to a past event in which a plurality of vehicles were parked on one side of a second road segment and a single vehicle was parked on the other side of the second road segment and had a vehicle-related ticket issued thereto. The historical data may further indicate a vehicle parking restriction rule was applied to the second road segment during the past event. As such, the assessment platform 123 may conclude a type of vehicle-related rule applied to the first road segment is also a vehicle parking restriction rule.

In one embodiment, the assessment platform 123 may determine a spatial extent of which a vehicle-related rule is applied at an area. For example, the assessment platform 213 may receive sensor data indicating that a plurality of vehicles is parked on a first side of a first road segment and a single vehicle is parked on a second opposing side of the first road segment and has a vehicle-related ticket issued thereto. Based on the sensor data, the assessment platform 213 may conclude that a spatial extent of a vehicle-related rule applied to the road segment is limited to the second side of the road segment, but not the first side of the road segment. In one embodiment, a spatial extent of a vehicle parking restriction rule may be defined by parked vehicles that have vehicle-related tickets issued thereto and parked vehicle that do not have vehicle-related tickets issued thereto. For instance, returning to the prior example, the sensor data may further indicate that a plurality of vehicles without vehicle-related tickets is parked within the first half of the road segment and the single vehicle with the vehicle-related ticket is parked in the second half of the road segment. Based on the sensor data, the assessment platform 123 may conclude that the spatial extent of the vehicle-related rule applied to the road segment is limited to the second half of the road segment on the second side of the road segment. In one embodiment, a spatial extent of which a vehicle-related rule is applied may be determined based on map data. For example, a vehicle-related rule may be applicable to an entire block, a specific side of a street, etc.

In one embodiment, in addition to indicating a number of vehicle-related tickets issued within an area and/or a parking orientation of each vehicle within the area, the attributes of the area may further indicate, for each road portion within the area: (1) a road type; (2) a functional class; (3) a number of lanes; (4) a presence of one or more bike lanes; (5) road dimensions; (6) one or more points-of-interests (POIs) associated with said road portion; (7) one or more road markings; (8) one or more road signs associated with said road portion; or (9) a combination thereof. The aforementioned attributes may be used to provide, for example, a type of vehicle-related rule applied to the area, a spatial extent of the vehicle-related rule applied to the area, and/or other information related with the area.

In one embodiment, the assessment platform 123 may embody a machine learning model for predicting a vehicle-related rule applied within an area, a type of vehicle-related rule applied to the area, a spatial extent of the vehicle-related rule applied to the area, or a combination thereof. In such embodiment, the machine learning model is trained based on training data, where the training data indicate past events in which vehicle-related rules were applied to various areas and vehicles within the areas received vehicle-related tickets. The training data may also indicate a number of vehicle-related tickets issued within the area, a parking orientation of each vehicle within the area, and one or more other attributes associated with the area (e.g., a road type, dimensions, functional class, etc.). The machine learning model receives the training data and transforms the training data into machine-readable and generalizable vectors. The machine learning model renders context around the training data such that commonalities can be detected. Once the machine learning model translates the training data into a vector format suitable to be used as a feature vector for machine learning, the assessment platform 123 trains the machine learning model on resulting pairs (i.e., observations as seen in the training data and desired output value). For example, a desired output value may be defined by a vehicle-related rule applied within an area, a type of vehicle-related rule applied to the area, a spatial extent of the vehicle-related rule applied to the area, or a combination thereof and observations may be defined by aggregating all occurrences of past events in which vehicle-related rules were applied to areas and vehicles within the areas received vehicle-related tickets and/or parked in certain orientations on a particular road segment during a particular setting (e.g., all occurrences having the same vector representation). In one embodiment, the machine learning model may incorporate supervised machine learning techniques. In one embodiment, the machine learning model may incorporate a standard regression or classification task. Once the machine learning model is trained, the machine learning model may receive input data indicating a number of vehicle-related tickets issued within an area and/or a parking orientation of each vehicle within the area and use the input data to generate output data indicating prediction of a vehicle-related rule applied within the area, a type of vehicle-related rule applied to the area, a spatial extent of the vehicle-related rule applied to the area, or a combination thereof.

In one embodiment, a likelihood in which a vehicle-related rule is applied to an area may be defined by a confidence level. The confidence level may increase in a similar manner as the likelihood. For example, if sensor data indicate that a number of vehicle-related tickets issued within an area during a first period is greater that the number of vehicle-related tickets issued within the area during a second period preceding the first period, the assessment platform 123 may increase the confidence. Prior to calculating the likelihood and/or the confidence level based on a comparison of sensor data and historical data associated with the area, the likelihood and/or the confidence level may be assigned a base value, where the base value either indicates uncertainty or absence newly establishment of a vehicle-related rule within the area within a predetermined period (e.g., within one or more years). As such, the likelihood and/or the confidence level increases based on the comparison of the sensor data and the historical data associated with the area. If the confidence level exceeds a threshold value, the assessment platform 123 may inform a user that the vehicle-related rule is applied to the area. In one embodiment, if the confidence level exceeds the threshold value, the assessment platform 123 may instruct one or more vehicles within the area to move to the area and detect a sign that indicates the vehicle-related rule applied within the area. Once the assessment platform 123 acquires sensor data defining the sign, the assessment platform 123 may provide additional information to a user, such as: (1) a spatial extent of which the vehicle-related rule is applied within the area; (2) one or more types of vehicles of which the vehicle-related rule is applied to; (3) one or more periods in which the vehicle-related rule is in effect; (4) a type of penalty issued for disobeying the vehicle-related rule; (5) other information associated with the vehicle-related rule; or (6) a combination thereof. In one embodiment, subsequent to rendering comparison between sensor data and historical data associated with the area, if the confidence level is below a threshold value, the assessment platform 123 may provide a recommendation to a user of a vehicle intending to park in the area to not park in the area. In one embodiment, subsequent to rendering comparison between sensor data and historical data associated with the area, if the confidence level is below a threshold value, the assessment platform 123 may request a local entity to verify existence of a vehicle-related rule within the area.

In one embodiment, the assessment platform 123 may receive sensor data indicating establishment of a vehicle-related rule for an area and inform a user indicating existence of the vehicle-related rule within the area. Specifically, the assessment platform 123 may receive sensor data from vehicles, roadside sensors, and/or other image sensors within the area, where the sensor data indicate an activity in which the vehicle-related rule is being established within the area. For example, such sensor data may indicate that a road management entity (e.g., a personnel and/or a vehicle) is present in the area and the entity installs a sign indicating the vehicle-related rule within the area. If the assessment platform 123 receives such sensor data, the assessment platform 123 informs vehicles intending to park in the area existence of the newly established vehicle-related rule within the area. In one embodiment, if the assessment platform 123 receives such sensor data, the assessment platform 123 updates map data to indicate the newly established vehicle-related rule within the area.

Figure 2:
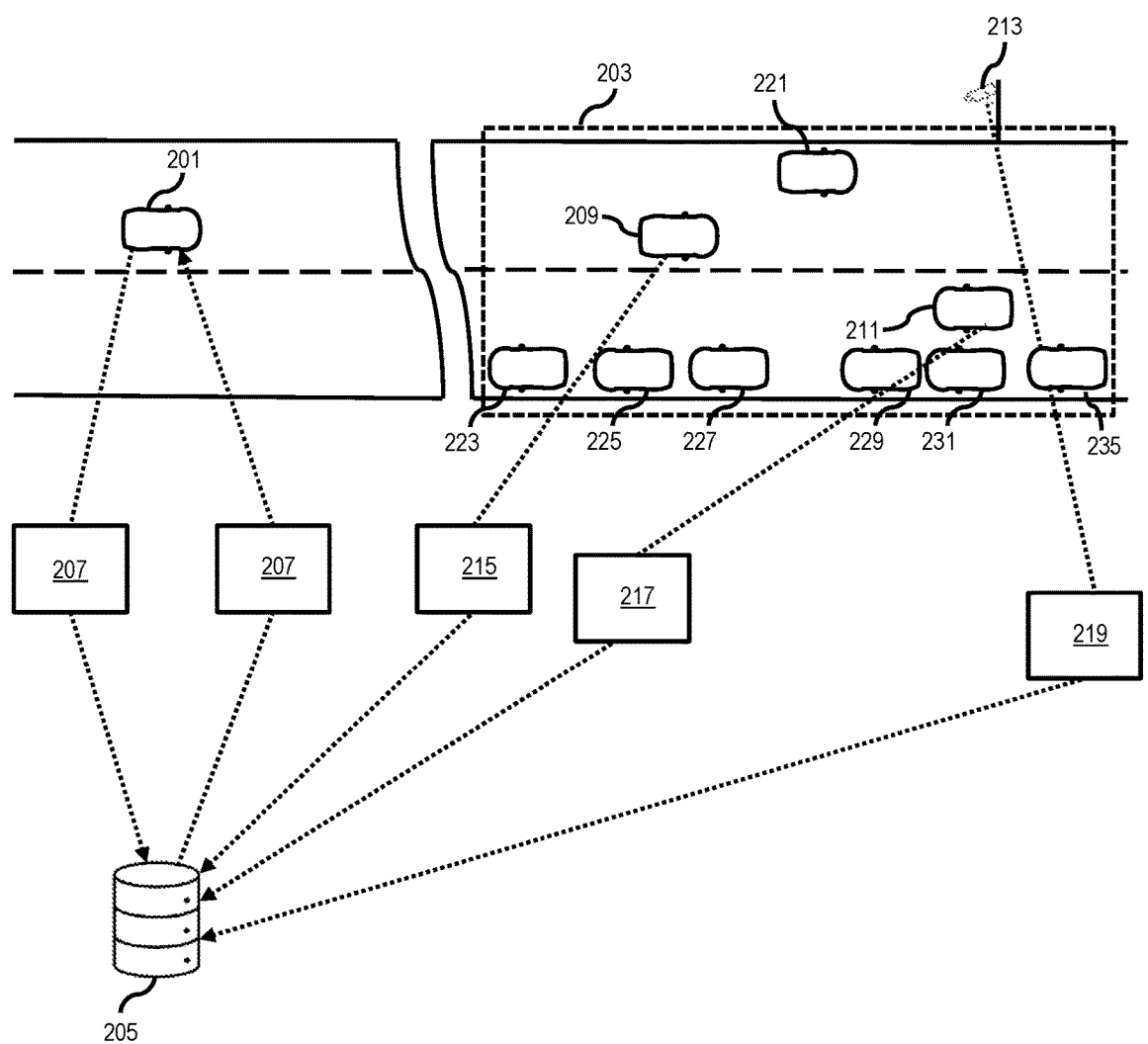
FIG. 2 illustrates an example scenario in which a newly established vehicle-related rule within an area is determined for a user.

FIG. 2 illustrates an example scenario 200 in which a newly established vehicle-related rule within an area is determined for a user. In the illustrated example, a user of a first vehicle 201 is traversing a route to reach a destination within an area 203. It is assumed that a road portion included within the area 203 is a subsequent portion of a road segment on which the first vehicle 201 is traversing or is a road segment that is different the current road segment on which the first vehicle 201 is traversing. In the illustrated example, the first vehicle 201 transmits to a server 205 a first data packet 207 including a request for determining a newly established vehicle-related rule within the area 203. The server 205 may be the assessment platform 123 of FIG. 1. Within the area 203, a second vehicle 209 and a third vehicle 211 are traversing the road portion within the area 203, and each of the vehicles is equipped with sensors (e.g., image sensors) for acquiring attributes associated with the area 203. Additionally, a surveillance post 213 is disposed within the area and is equipped with one or more sensors for capturing the attributes of the area 203. Sensor data acquired by the second vehicle 209, the third vehicle 211, and the surveillance post 213 are transmitted to the server 205 as a second data packet 215, a third data packet 217, and a fourth data packet 219, respectively. In addition to the sensor data, each of the second data packet 215, the third data packet 217, and the fourth data packet 219 may also indicate locations of the second vehicle 209, the third vehicle 211, and the surveillance post 213 and timings in which the second vehicle 209, the third vehicle 211, and the surveillance post 213 acquired the sensor data. In the illustrated embodiment, a fourth vehicle 221 is parked at a first side of a road within the area 203, and a plurality of vehicles 223, 225, 227, 229, 231, and 235 is parked at a second opposing side of the road within the area 203. The fourth vehicle 221 has a ticket attached thereto, and none of the plurality of vehicles 223, 225, 227, 229, 231, and 235 includes a ticket. The server 205 processes the second data packet 215, the third data packet 217, and the fourth data packet 219 and determines the attributes of the area 203, namely, a number of vehicle-related tickets issued within the area 203 and orientations of vehicles parked within the area 203. The server 205 compares the current attributes of the area 203 with historical data, where the historical data indicate one or more past events indicating the attributes of the area 203. The historical data indicate that during the one or more past events, vehicles were parked evenly at the first side and the second side of the road. As such, the server 205 determines that the number of vehicle-related tickets issued within the area 203 and the orientations of vehicles parked within the area 203 indicate existence of a vehicle-related rule within the area 203. Additionally, the server 205 further determines that a vehicle parking restriction rule is applied at the first side of the road within the area 203 since a single vehicle (i.e., the fourth vehicle 221) is parked at the first side of the road and the plurality of vehicles 223, 225, 227, 229, 231, and 235 is parked at the opposing side of the road. The server 205 transmits a fifth data packet 221 to the first vehicle 201, where the fifth data packet 221 indicate the existence of the vehicle-related within the area 203, a type of vehicle-related rule within the area 203 (i.e., a vehicle parking restriction rule), and a spatial extent in which the vehicle-related rule is applied within the area 203 (i.e., the first side of the road).

Figure 3:
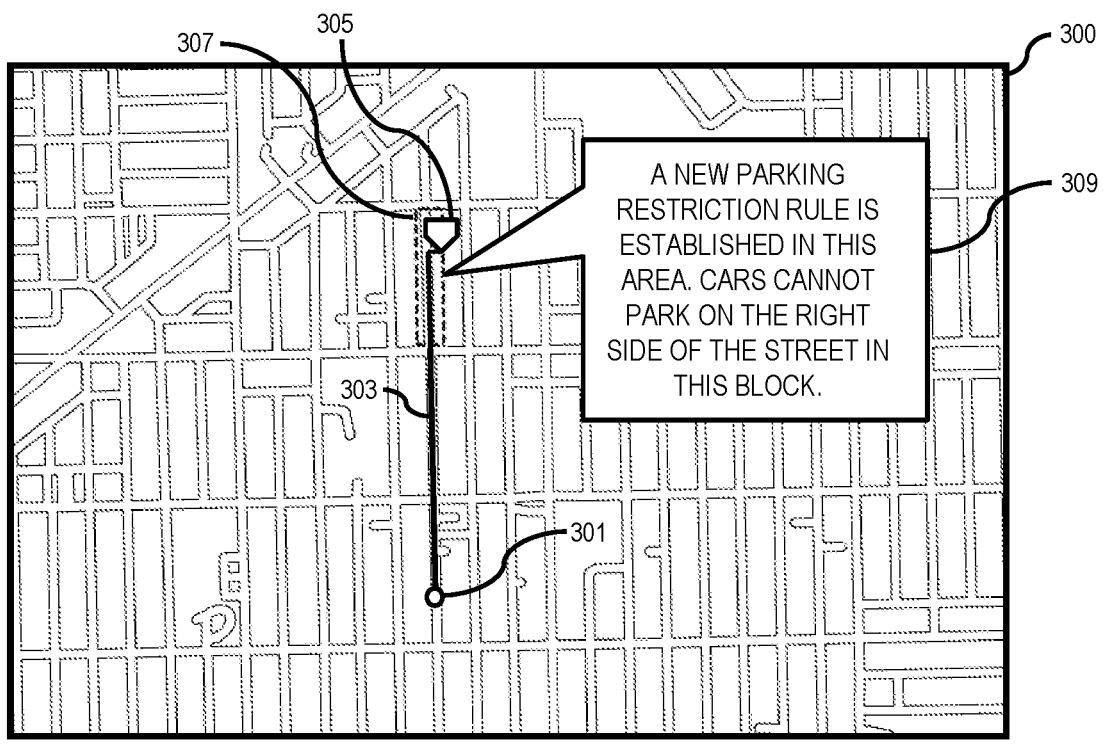
FIG. 3 illustrates an example graphical interface notifying a newly established vehicle parking restriction rule.

Returning to FIG. 1., the assessment platform 123 is capable of generating notifications and/or other types of information at a user device of a user intending to park his/her vehicle at an area in which a vehicle-related rule is established. Such notifications may indicate: (1) a likelihood in which the vehicle-related rule is established within the area; (2) a type of vehicle-related rule; and (3) a spatial extent of which the vehicle-related rule is applied. In one embodiment, depending on the type of vehicle-related rule established for the area, the notification may further include a recommendation for the user to mitigate instances in which the user does not follow the vehicle-related rule established for the area. By way of example, if the vehicle-related rule is a parking restriction rule, the assessment platform 123 may advise the user to pay a parking meter at the area or acquire a parking pass for parking in the area. In one embodiment, if the assessment platform 123 determines that a vehicle-related rule is established for an area, the assessment platform 123 may provide alternative parking locations for a user of a vehicle intending to park within the area. In one embodiment, the assessment platform 123 may cause a user device (e.g., UE 101) and/or a user interface associated with a vehicle (e.g., vehicle 105) to generate a graphical interface indicating the notifications. FIG. 3 illustrates an example graphical interface 300 notifying a newly established vehicle parking restriction rule. In the illustrated example, the graphical interface 300 resembles a map and includes a vehicle icon 301 representing a current location of a vehicle, a route 303 to a destination of the vehicle, and a destination icon 305 representing the destination. The assessment platform 123 has: (1) received sensor data indicating attributes of an area within a highlighted region 307; (2) compared the attributes to historical data; and (3) based on the comparison, determined that a new parking restriction rule has been established within the highlighted region 307. Additionally, the assessment platform 123 has determined that vehicles cannot park on the right side of the street within the highlighted region 307. As such, the assessment platform 123 has caused the graphical interface 300 to further display a message 309 stating "A NEW PARKING RESTRICTION RULE IS ESTABLISHED IN THIS AREA. CARS CANNOT PARK ON THE RIGHT SIDE OF THE STREET IN THIS BLOCK."

The assessment platform 123 can be implemented in hardware, firmware, software, or a combination thereof. Though depicted as a separate entity in FIG. 1, it is contemplated that the assessment platform 123 may be implemented for direct operation by the UE 101, the vehicle 105, the services platform 115, one or more of the content providers 119, or a combination thereof. As such, the assessment platform 123 may generate direct signal inputs by way of the operating system of the UE 101, the vehicle 105, the services platform 115, the one or more of the content providers 119, or the combination thereof for interacting with the applications 103. The various executions presented herein contemplate any and all arrangements and models.

In the illustrated embodiment, the database 125 stores information on road links (e.g., road length, road breadth, slope information, curvature information, geographic attributes, etc.), probe data for one or more road links (e.g., traffic density information), POIs, and other types map-related features. In one embodiment, the database 125 may include any multiple types of information that can provide means for aiding in determining a newly established vehicle-related rule within an area. It should be appreciated that the information stored in the database 125 may be acquired from any of the elements within the system 100, other vehicles, sensors, database, or a combination thereof.

In one embodiment, the UE 101, the vehicle 105, the detection entity 113, the services platform 115, the content providers 119, the assessment platform 123 communicate with each other and other components of the communication network 121 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 4:
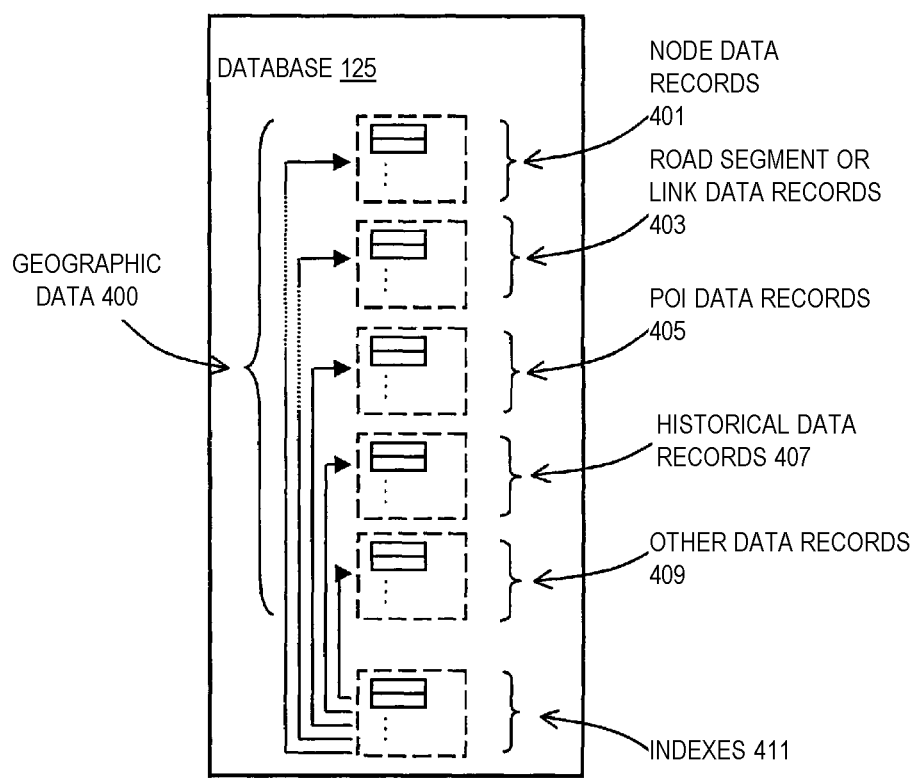
FIG. 4 illustrates a diagram of a database of FIG. 1.

FIG. 4 is a diagram of a database 125 (e.g., a map database), according to one embodiment. In one embodiment, the database 125 includes data 400 used for (or configured to be compiled to be used for) mapping and/or navigation-related services, such as for personalized route determination, according to exemplary embodiments.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the database 125.

"Node"—A point that terminates a link.

"Line segment"—A line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the database 125 follows certain conventions. For example, links do not cross themselves and do not cross each other except at a node or vertex. Also, there are no duplicated shape points, nodes, or links. Two links that connect each other have a common node or vertex. In the database 125, overlapping geographic features are represented by overlapping polygons. When polygons overlap, the boundary of one polygon crosses the boundary of the other polygon. In the database 125, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the database 125 is presented according to a hierarchical or multi-level tile projection. More specifically, in one embodiment, the database 125 may be defined according to a normalized Mercator projection. Other projections may be used. In one embodiment, a map tile grid of a Mercator or similar projection can a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grids. Because of the numbering system, the exact position of any tile in any level of the map tile grid or projection may be uniquely determined from the tile ID.

As shown, the database 125 includes node data records 401, road segment or link data records 403, POI data records 405, historical data records 407, other records 409, and indexes 411, for example. More, fewer or different data records can be provided. In one embodiment, additional data records (not shown) can include cartographic ("carto") data records, routing data, and maneuver data. In one embodiment, the indexes 411 may improve the speed of data retrieval operations in the database 125. In one embodiment, the indexes 411 may be used to quickly locate data without having to search every row in the database 125 every time it is accessed.

In exemplary embodiments, the road segment or link data records 403 are links or segments representing roads, streets, or paths, as can be used in the calculated route or recorded route information for determination of one or more personalized routes. The node data records 401 are end points (such as intersections) corresponding to the respective links or segments of the road segment data records 403. The road segment or link data records 403 and the node data records 401 represent a road network, such as used by vehicles, cars, and/or other entities. Alternatively, the database 125 can contain path segment and node data records or other data that represent pedestrian paths or areas in addition to or instead of the vehicle road record data, for example. In one embodiment, the road or path segments can include an altitude component to extend to paths or road into three-dimensional space (e.g., to cover changes in altitude and contours of different map features, and/or to cover paths traversing a three-dimensional airspace).

Links, segments, and nodes can be associated with attributes, such as geographic coordinates, road surface type, road surface condition, functional class, curvature, degree of traffic, number and types of accidents that have occurred, a number of road objects (e.g., road markings, road signs, traffic light posts, etc.), types of road objects, traffic directions, street names, address ranges, speed limits, turn restrictions at intersections, presence of roadworks, and other navigation related attributes, as well as POIs, such as gasoline stations, hotels, restaurants, museums, stadiums, offices, automobile dealerships, auto repair shops, factories, buildings, stores, parks, etc. The database 125 can include data about the POIs and their respective locations in the POI data records 405. The database 125 can also include data about places, such as cities, towns, or other communities, and other geographic features, such as bodies of water, mountain ranges, etc. Such place or feature data can be part of the POI data records 405 or can be associated with POIs or POI data records 405 (such as a data point used for displaying or representing a position of a city).

The historical data records 407 indicate attributes of areas, where the attributes indicate, for each of the areas, a number of vehicle-related tickets issued within the area and vehicle parking orientations within the area. In one embodiment, the attributes of the areas may be associated with the node data records 401, the road segment or link data records 403, the POI data records 405, or a combination thereof to indicate, for each of the areas: (1) a road type; (2) a functional class; (3) a number of lanes; (4) a presence of one or more bike lanes; (5) road dimensions; (6) one or more points-of-interests (POIs) associated with said road portion; (7) one or more road markings; (8) one or more road signs associated with said road portion; or (9) a combination thereof.

Other data records 409 may include images of vehicle-related tickets, where the images are used for performing image classification to identify whether a vehicle-related ticket is issued to a vehicle. The other data records 409 may also embody algorithms defining a machine learning model trained to predict a vehicle-related rule applied within an area.

In one embodiment, the database 125 can be maintained by the services platform 115 and/or one or more of the content providers 119 in association with a map developer. The map developer can collect geographic data to generate and enhance the database 125. There can be different ways used by the map developer to collect data. These ways can include obtaining data from other sources, such as municipalities or respective geographic authorities. In addition, the map developer can employ field personnel to travel by vehicle along roads throughout the geographic region to observe attributes associated with one or more road segments and/or record information about them, for example. Also, remote sensing, such as aerial or satellite photography, can be used.

The database 125 can be a master database stored in a format that facilitates updating, maintenance, and development. For example, the master database or data in the master database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for determining a newly established vehicle-related rule within an area may be advantageously implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof.

Figure 5:
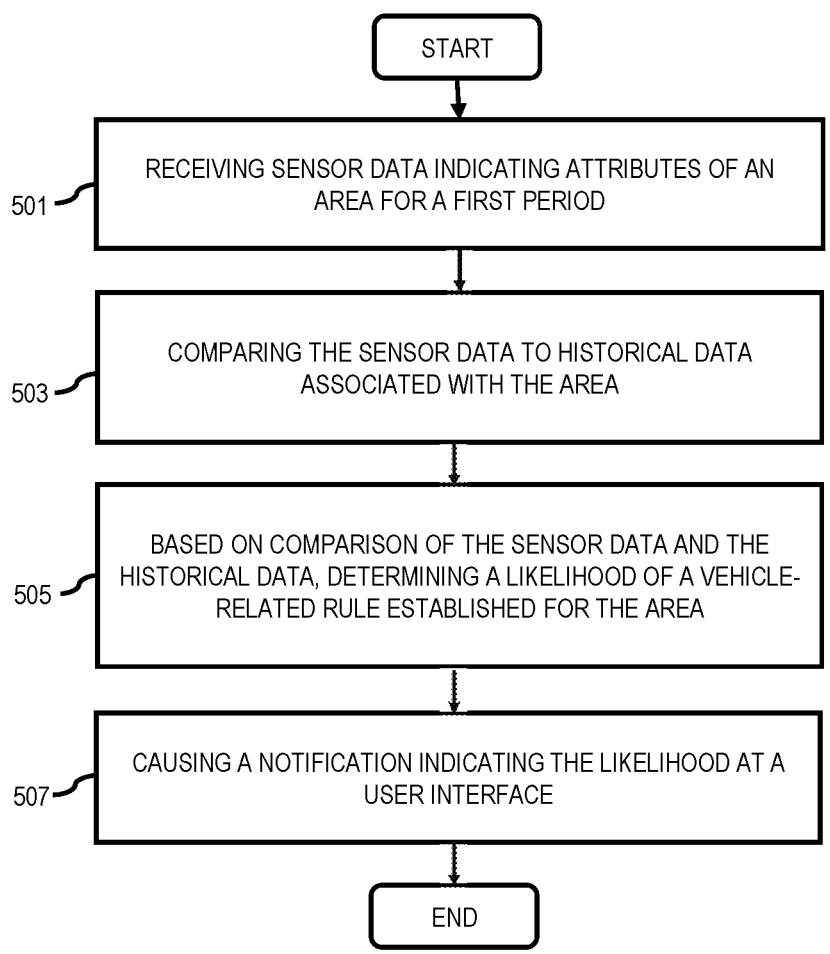
FIG. 5 illustrates a flowchart of a process for determining a newly established vehicle-related rule within an area.
Figure 7:
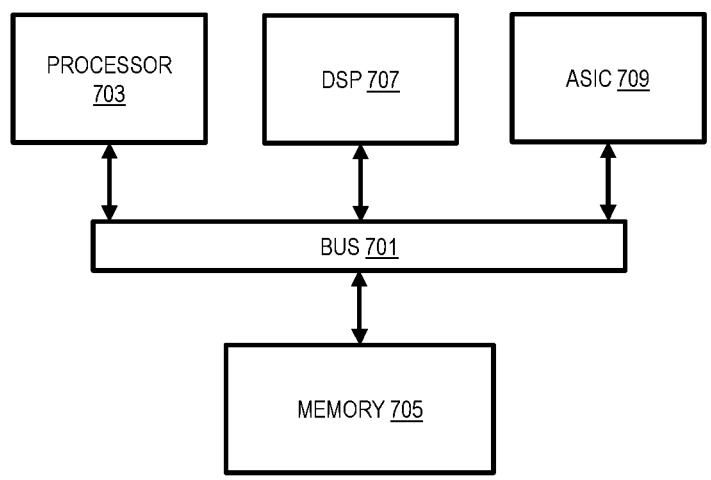
FIG. 7 illustrates a chip set or chip upon which an embodiment may be implemented.

FIG. 5 is a flowchart of a process 500 for determining a newly established vehicle-related rule within an area, according to one embodiment. In one embodiment, the assessment platform 123 performs the process 500 and is implemented in, for instance, a chip set including a processor and a memory as shown in FIG. 7.

In step 501, the assessment platform 123 receives sensor data indicating attributes of an area for a first period. The attributes indicate a number of vehicle-related tickets issued within the area, a parking orientation of each vehicle within the area, or a combination thereof. The sensor data may be provided by vehicles equipped with sensors and/or roadside sensors that are within the area or were within the area during the first period.

In step 503, the assessment platform 123 compares the sensor data to historical data associated with the area. The historical data indicate the attributes of the area for one or more second periods preceding the first period.

In step 505, the assessment platform 123 determine a likelihood of a vehicle-related rule established for the area based on comparison of the sensor data and the historical data. The vehicle-related rule may be a rule that did not exist within the area during the one or more second periods. In one embodiment, the assessment platform 123 increases the likelihood if the number of vehicle-related tickets issued within the area for the first period exceeds the number of vehicle-related tickets issued within the area for each of the one or more second periods. In one embodiment, the assessment platform 123 determines an average number of vehicle-related tickets issued within the area based on the historical data and compares the average number of vehicle-related tickets to the number of vehicle-related tickets issued within the area for the first period. If the number of vehicle-related tickets issued within the area for the first period exceeding the average number of vehicle-related tickets, the assessment platform 123 increases the likelihood. In one embodiment, the assessment platform 123 determines one or more patterns of vehicle parking orientations within the area based on the historical data and compare parking orientations of all vehicles within the area for the first period to the one or more patterns of vehicle parking orientations. If the parking orientations of all vehicles within the area for the first period deviate from the one or more patterns of vehicle parking orientations, the assessment platform 123 increases the likelihood.

In step 507, the assessment platform 123 causes a notification indicating the likelihood at a user interface. The user interface may be a user device of a user intending to park his/her vehicle at a location within the area.

The system, apparatus, and methods described herein reliably detects local map changes and informs user of vehicles regarding said changes, thereby preventing instances in which fines or penalties are issued to the users. Additionally, since the system, apparatus, and methods provide notification indicating a local map change to a user of a vehicle prior to the vehicle reaching a destination in which the local map change is applied, the user can readily plan for alternative destinations and need not waste resources to reach the destination to identify the local map changes therein.

The processes described herein may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
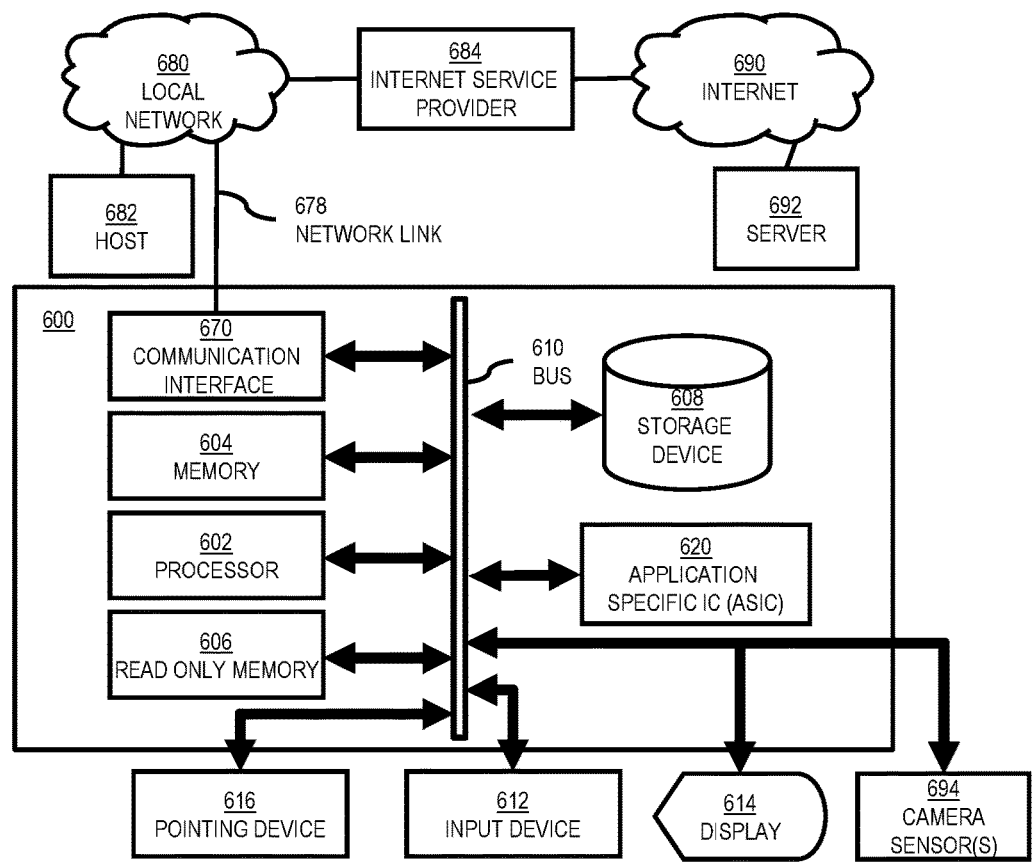
FIG. 6 illustrates a computer system upon which an embodiment may be implemented.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to determine a newly established vehicle-related rule within an area as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of determining a newly established vehicle-related rule within an area.

A bus 610 includes one or more parallel conductors of information so that information is transferred quickly among devices coupled to the bus 610. One or more processors 602 for processing information is coupled with the bus 610.

A processor (or multiple processors) 602 performs a set of operations on information as specified by computer program code related to determining a newly established vehicle-related rule within an area. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 600 also includes a memory 604 coupled to bus 610. The memory 604, such as a random access memory (RAM) or any other dynamic storage device, stores information including processor instructions for determining a newly established vehicle-related rule within an area. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for determining a newly established vehicle-related rule within an area, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614, and one or more camera sensors 694 for capturing, recording and causing to store one or more still and/or moving images (e.g., videos, movies, etc.) which also may comprise audio recordings. In some embodiments, for example, in embodiments in which the computer system 600 performs all functions automatically without human input, one or more of external input device 612, display device 614 and pointing device 616 may be omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 121 for determining a newly established vehicle-related rule within an area to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media.

Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 682 connected to the Internet hosts a process that provides a service in response to information received over the Internet. For example, server host 682 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 682 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to determine a newly established vehicle-related rule within an area as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of determining a newly established vehicle-related rule within an area.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 707. A DSP 707 typically is configured to process real-world signals (e.g., sound) in real-time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors. The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to determine a newly established vehicle-related rule within an area. The memory 705 also stores the data associated with or generated by the execution of the inventive steps.

Figure 8:
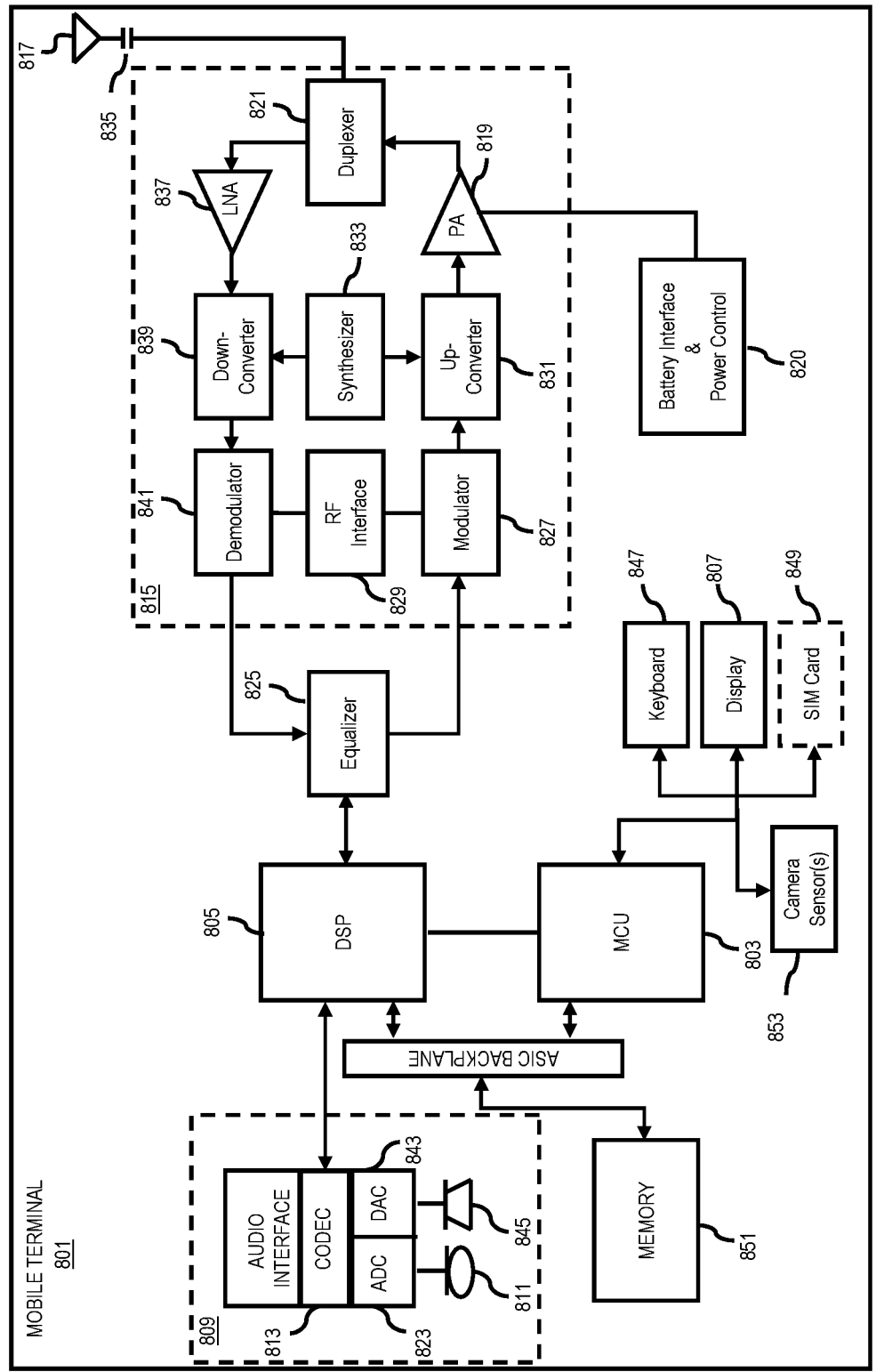
FIG. 8 illustrates a diagram of exemplary components of a mobile terminal for communications, which is capable of operating in the system of FIG. 1.

FIG. 8 is a diagram of exemplary components of a mobile terminal 801 (e.g., a mobile device or vehicle or part thereof) for communications, which is capable of operating in the system of FIG. 1, according to one embodiment. In some embodiments, mobile terminal 801, or a portion thereof, constitutes a means for performing one or more steps of determining a newly established vehicle-related rule within an area. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit.

A main display unit 807 provides a display to the user in support of various applications and mobile terminal functions that perform or support the steps of determining a newly established vehicle-related rule within an area. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to determine a newly established vehicle-related rule within an area. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

Further, one or more camera sensors 853 may be incorporated onto the mobile station 801 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. An apparatus comprising at least one processor and at least one non-transitory memory including computer program code instructions, the computer program code instructions configured to, when executed, cause the apparatus to:
   receive sensor data indicating attributes of an area for a first period, the attributes indicating a number of vehicle-related tickets issued within the area, a parking orientation of each vehicle within the area, or a combination thereof;
   compare the sensor data to historical data associated with the area, the historical data indicating the attributes of the area for one or more second periods preceding the first period,
   based on comparison of the sensor data and the historical data, determine a likelihood of a vehicle-related rule established for the area, wherein the vehicle-related rule did not exist during the one or more second periods;
   responsive to the number of vehicle-related tickets issued within the area for the first period exceeding the number of vehicle-related tickets issued within the area for each of the one or more second periods, increase the likelihood; and
   cause a notification indicating the likelihood at a user interface.

2. The apparatus of claim 1, wherein, to determine the likelihood, the computer program code instructions are further configured to, when executed, cause the apparatus to:
   determine an average number of vehicle-related tickets issued within the area based on the historical data;
   compare the average number of vehicle-related tickets to the number of vehicle-related tickets issued within the area for the first period;
   responsive to the number of vehicle-related tickets issued within the area for the first period exceeding the average number of vehicle-related tickets, increase the likelihood.

3. The apparatus of claim 1, wherein the computer program code instructions are further configured to, when executed, cause the apparatus to:
   based on the sensor data and the historical data, determine a type of vehicle-related rule established for the area; and
   cause an additional notification indicating the type of vehicle-related rule at the user interface.

4. The apparatus of claim 1, wherein the computer program code instructions are further configured to, when executed, cause the apparatus to:
   based on the sensor data, determine a spatial extent of which the vehicle-related rule is applied within the area; and
   cause an additional notification indicating the spatial extent at the user interface.

5. The apparatus of claim 1, wherein the attributes further indicate, for each road portion within the area: (i) a road type; (ii) a functional class; (iii) a number of lanes; (iv) a presence of one or more bike lanes; (v) road dimensions; (vii) one or more points-of-interests (POIs) associated with said road portion; (viii) one or more road markings; (ix) one or more road signs associated with said road portion; or (x) a combination thereof.

6. A non-transitory computer-readable storage medium having computer program code instructions stored therein, the computer program code instructions, when executed by at least one processor, cause the at least one processor to:
   receive sensor data indicating attributes of an area for a first period, the attributes indicating a number of vehicle-related tickets issued within the area, a parking orientation of each vehicle within the area, or a combination thereof;
   compare the sensor data to historical data associated with the area, the historical data indicating the attributes of the area for one or more second periods preceding the first period,
   based on comparison of the sensor data and the historical data, determine a likelihood of a vehicle-related rule established for the area, wherein the vehicle-related rule did not exist during the one or more second periods;
   responsive to the number of vehicle-related tickets issued within the area for the first period exceeding the number of vehicle-related tickets issued within the area for each of the one or more second periods, increase the likelihood; and
   cause a notification indicating the likelihood at a user interface.

7. The non-transitory computer-readable storage medium of claim 6, to determine the likelihood, the computer program code instructions, when executed by the at least one processor, cause the at least one processor to:
   determine an average number of vehicle-related tickets issued within the area based on the historical data;
   compare the average number of vehicle-related tickets to the number of vehicle-related tickets issued within the area for the first period;
   responsive to the number of vehicle-related tickets issued within the area for the first period exceeding the average number of vehicle-related tickets, increase the likelihood.

8. The non-transitory computer-readable storage medium of claim 6, to determine the likelihood, the computer program code instructions, when executed by the at least one processor, cause the at least one processor to:
   determine one or more patterns of vehicle parking orientations within the area based on the historical data;
   compare parking orientations of all vehicles within the area for the first period to the one or more patterns of vehicle parking orientations;
   responsive to the parking orientations of all vehicles within the area for the first period deviating from the one or more patterns of vehicle parking orientations, increase the likelihood.

9. The non-transitory computer-readable storage medium of claim 6, the computer program code instructions, when executed by the at least one processor, cause the at least one processor to:
   based on the sensor data and the historical data, determine a type of vehicle-related rule established for the area; and
   cause an additional notification indicating the type of vehicle-related rule at the user interface.

10. The non-transitory computer-readable storage medium of claim 6, the computer program code instructions, when executed by the at least one processor, cause the at least one processor to:
    based on the sensor data, determine a spatial extent of which the vehicle-related rule is applied within the area; and
    cause an additional notification indicating the spatial extent at the user interface.

11. The non-transitory computer-readable storage medium of claim 6, wherein the attributes further indicate, for each road portion within the area: (i) a road type; (ii) a functional class; (iii) a number of lanes; (iv) a presence of one or more bike lanes; (v) road dimensions; (vii) one or more points-of-interests (POIs) associated with said road portion; (viii) one or more road markings; (ix) one or more road signs associated with said road portion; or (x) a combination thereof.

12. An apparatus comprising at least one processor and at least one non-transitory memory including computer program code instructions, the computer program code instructions configured to, when executed, cause the apparatus to:
receive sensor data indicating attributes of an area for a first period, the attributes indicating a number of vehicle-related tickets issued within the area, a parking orientation of each vehicle within the area, or a combination thereof;
compare the sensor data to historical data associated with the area, the historical data indicating the attributes of the area for one or more second periods preceding the first period,
based on comparison of the sensor data and the historical data, determine a likelihood of a vehicle-related rule established for the area, wherein the vehicle-related rule did not exist during the one or more second periods;
determine one or more patterns of vehicle parking orientations within the area based on the historical data;
compare parking orientations of all vehicles within the area for the first period to the one or more patterns of vehicle parking orientations;
responsive to the parking orientations of all vehicles within the area for the first period deviating from the one or more patterns of vehicle parking orientations, increase the likelihood; and
cause a notification indicating the likelihood at a user interface.

\* \* \* \* \*